United States Patent
Moorjani et al.

(10) Patent No.: US 9,202,469 B1
(45) Date of Patent: Dec. 1, 2015

(54) CAPTURING NOTEWORTHY PORTIONS OF AUDIO RECORDINGS

(71) Applicant: Citrix Systems, Inc., Fort Lauderdale, FL (US)

(72) Inventors: Yogesh Moorjani, Goleta, CA (US); Ryan Warren Kasper, Goleta, CA (US); Ashish V. Thapliyal, Santa Barbara, CA (US); Ajay Kumar, Morrisville, NC (US); Abhinav Kuruvadi Ramesh Babu, Pittsburgh, PA (US); Elizabeth Thapliyal, Santa Barbara, CA (US); James Kalbach, Jersey City, NJ (US); Margaret Dianne Cramer, Goleta, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 14/487,361

(22) Filed: Sep. 16, 2014

(51) Int. Cl.
 *G10L 25/87* (2013.01)
 *G10L 15/26* (2006.01)

(52) U.S. Cl.
 CPC .............. *G10L 15/26* (2013.01); *G10L 25/87* (2013.01)

(58) Field of Classification Search
 CPC .............. G10L 25/78; G10L 2025/783; G10L 2025/786; G10L 25/81; G10L 25/84; G10L 25/87
 See application file for complete search history.

(56) References Cited

U.S. PATENT DOCUMENTS

| | | | |
|---|---|---|---|
| 6,236,970 B1 * | 5/2001 | Imai et al. | 704/278 |
| 6,381,568 B1 * | 4/2002 | Supplee et al. | 704/210 |
| 6,405,168 B1 * | 6/2002 | Bayya et al. | 704/256 |
| 6,477,493 B1 * | 11/2002 | Brooks et al. | 704/246 |
| 6,480,191 B1 * | 11/2002 | Balabanovic | 345/419 |
| 6,490,561 B1 * | 12/2002 | Wilson et al. | 704/251 |
| 2002/0010916 A1 * | 1/2002 | Thong et al. | 725/1 |
| 2003/0054802 A1 * | 3/2003 | Xie | 455/412 |
| 2003/0055634 A1 * | 3/2003 | Hidaka et al. | 704/222 |
| 2004/0015352 A1 * | 1/2004 | Ramakrishnan et al. | 704/240 |
| 2004/0071344 A1 * | 4/2004 | Lui et al. | 382/181 |
| 2005/0086060 A1 * | 4/2005 | Gleason et al. | 704/278 |
| 2006/0074663 A1 * | 4/2006 | Shao et al. | 704/254 |
| 2010/0121637 A1 * | 5/2010 | Roy et al. | 704/235 |
| 2012/0022865 A1 * | 1/2012 | Milstein | 704/235 |

OTHER PUBLICATIONS

Thapliyal, et al., "Computer System Employing Speech Recognition for Detection of Non-Speech Audio," U.S. Appl. No. 13/929,375, filed Jun. 27, 2013.

Thapliyal, et al., "Generating Electronic Summaries of Online Meetings," U.S. Appl. No. 14/081,157, filed Nov. 15, 2013.

(Continued)

*Primary Examiner* — Eric Yen
(74) *Attorney, Agent, or Firm* — BainwoodHuang

(57) ABSTRACT

A technique for recording dictation, meetings, lectures, and other events includes automatically segmenting an audio recording into portions by detecting speech transitions within the recording and selectively identifying certain portions of the recording as noteworthy. Noteworthy audio portions are displayed to a user for selective playback. The user can navigate to different noteworthy audio portions while ignoring other portions. Each noteworthy audio portion starts and ends with a speech transition. Thus, the improved technique typically captures noteworthy topics from beginning to end, thereby reducing or avoiding the need for users to have to search for the beginnings and ends of relevant topics manually.

18 Claims, 11 Drawing Sheets

(56) References Cited

OTHER PUBLICATIONS

Imesart S.a.r.I., "Audio Memos Free—The Voice Recorder," Application Store on iTunes, iTunes Preview, pp. 1-3.

KendiTech, "Voice Memos for iPad," Application Store on iTunes, iTunes Preview, pp. 1-2.

Pichak co., "Recordium Pro," Application Store on iTunes, iTunes Preview, pp. 1-3.

Google, "Dictomate—MP3 Voice Recorder," Android Applications on Google Play, pp. 1-2.

\* cited by examiner

CAPTURING NOTEWORTHY PORTIONS OF AUDIO RECORDINGS

BACKGROUND

Computers and mobile devices are commonly equipped with hardware and software for recording and playing back audio signals. For example, desktop and laptop computers may employ microphones, sound processing cards, and speakers, and may use various programs, such as "Sound Recorder," "Garage Band," "Windows Media Player," and/or "iTunes," for example, for acquiring, organizing, and/or playing back audio recordings. Likewise, mobile devices, such as smart phones, tablets, personal readers, and PDAs (Personal Data Assistants), for example, can be equipped with microphones, speakers and sound processing hardware and may include a variety of applications ("apps") for managing audio recordings.

Apple's "Voice Memos" app is widely distributed with iOS devices, such as iPhones, iPads, and iPods. Voice Memos allows users to record their own dictation, as well as meetings and lectures. Users can manually trim recordings to remove unwanted content, can backup recordings to a computer or to the cloud, and can share recordings with other users via AirDrop, email, or text messaging.

Third party apps are also widely available for audio recording and provide additional features. For example, an iOS app called "Recordium" records sounds and allows users to append notes, memos, and photos. Users can apply tags within an audio stream to serve as bookmarks. Users can also view waveform displays of sound recordings and manually highlight audio segments within recordings for future reference.

SUMMARY

Audio recordings of dictation, lectures, meetings, and other events often include information that ranges from trivial to critical. For example, a user may record a 90-minute meeting in which only 15 minutes of content are worth remembering for the user. After a recording has been made, the user may wish to go back and listen to particular portions of the recording again. Unfortunately, finding the relevant portions in a lengthy recording can be time-consuming. For example, the user may listen to the recording from beginning to end, but at a high cost in terms of the user's time. Also, the user may miss critical information if he or she momentarily loses focus. The user may also hunt for particular information by skipping around the recording manually. But even when the user finds relevant portions, the user still faces the painstaking task of searching for locations where the relevant portions began and ended. Apps like Recordium can help somewhat by allowing users to insert tags at various points along an audio stream while the audio is being recorded; however, users generally insert such tags only after realizing that a currently-recording portion of audio is important. Thus, tags do not typically identify points in the audio stream when the discussion first turned to the relevant topics, but rather points that occurred sometime later. Thus, even when tags are inserted in an audio stream, users must still face the painstaking task of finding where the relevant portions of audio began and ended. What is needed is a way to improve user experience by making it easier for users to find complete portions of audio recordings that are important to them.

In contrast with conventional audio recording technologies, an improved technique for recording dictation, meetings, lectures, and other events includes automatically segmenting an audio recording into portions by detecting speech transitions within the recording and selectively identifying certain portions of the recording as noteworthy. In some examples, a user can adjudge whether a currently-recording portion of audio is noteworthy and can perform a predetermined manual operation, e.g., by tapping a button. Alternatively, or additionally, the technique can adjudge noteworthiness automatically, such as based on heuristics gleaned from the recording itself. Noteworthy audio portions are then displayed to a user for selective playback. The user can navigate to different noteworthy audio portions while ignoring other portions. Each noteworthy audio portion starts and ends with a speech transition. Thus, the improved technique typically captures noteworthy topics from beginning to end, thereby reducing or avoiding the need for users to have to search for the beginnings and ends of relevant topics manually.

Certain embodiments are directed to a method of recording human speech. The method includes acquiring an audio signal from a microphone coupled to electronic circuitry to record the audio signal on a storage medium coupled to the electronic circuitry. The audio signal conveys human speech. The method further includes identifying, by the electronic circuitry in real time as the audio signal is being acquired, (i) a set of speech transitions in the audio signal that mark boundaries between respective portions of human speech, and (ii) a set of noteworthy audio segments. Each noteworthy audio segment is one of the portions of human speech and meets a noteworthiness criterion. The noteworthiness criterion provides a standard for evaluating the noteworthiness of the respective portion of human speech. The method still further includes, after recording the audio signal, displaying a list of the identified set of noteworthy audio segments to enable a user selectively to play back any of the noteworthy audio segments.

Other embodiments are directed to a computing device constructed and arranged to perform a method of recording human speech, such as that described above. Still other embodiments are directed to a computer program product. The computer program product includes a non-transitory, computer-readable medium that stores instructions which, when executed by processing circuitry, cause the processing circuitry to perform a method of recording human speech, such as that described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the example embodiments disclosed.

An improved technique for recording dictation, meetings, lectures, and other events includes automatically segmenting an audio recording into portions by detecting speech transitions within the recording and selectively identifying certain portions of the recording as noteworthy. The technique further includes presenting noteworthy audio portions to users for selective playback.

Figure 1:
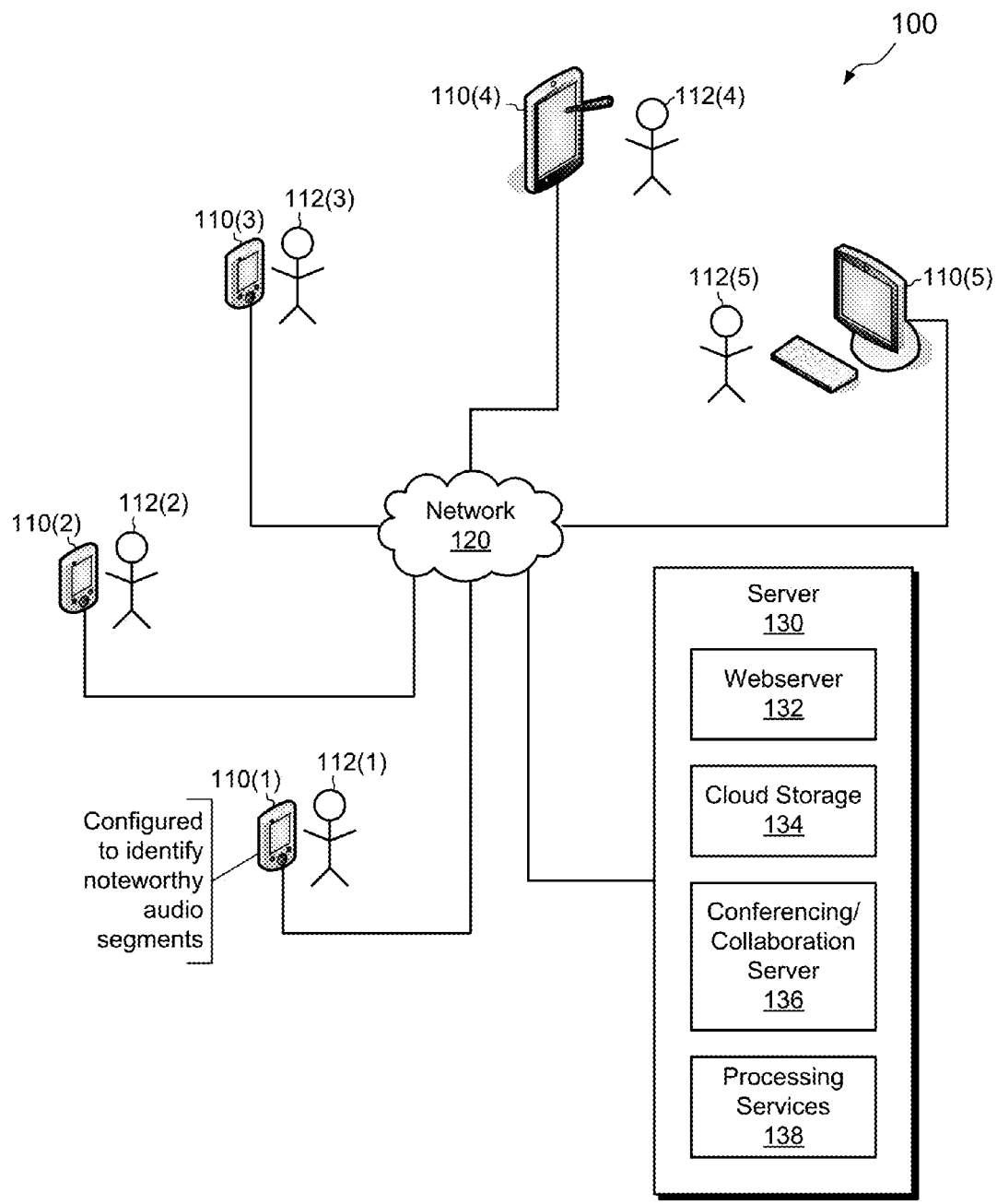
FIG. 1 is a block diagram of an example environment in which embodiments of the improved technique hereof can be practiced.

FIG. 1 shows an example environment 100 in which embodiments of the improved technique hereof can be practiced. Here, one or more computing devices, 110(1) through 110(5), are respectively configured to capture audio signals conveying human speech from any of users 112(1) through 112(5) and to identify noteworthy audio segments in the captured audio. In some examples, the computing devices 110(1) to 110(5) are connected to a network 120 to enable communication with one another and/or with a server 130. The server 130 may include a webserver 132, cloud storage 134, a conferencing/collaboration server 136, and processing services 138, for example. Any number of computing devices and users may be provided.

It should be understood that the computing devices 110(1) to 110(5) can each be realized with any suitable machine capable of acquiring and processing audio signals, such as a desktop computer, laptop computer, smartphone, tablet, PDA, and so forth. The network 130 can be realized with any suitable network or networks capable of conveying data, such as a LAN (Local Area Network), WAN (Wide Area Network), the Internet, telephone networks, cell phone networks, or any combination of the foregoing, for example. The server 130 can be implemented using any number of computing machines, including a single machine.

The technique hereof can be practiced using any individual computing device, such as by any of the computing devices 110(1) to 110(5) acting alone. The technique can also be practiced by any of the computing devices 110(1) to 110(5) acting in cooperation with the server 130 and/or with other computing devices, such as for participating in a web conference, online meeting, lecture, webcast, or other collaborative session.

In one type of example operation, a user, such as user 112(1), operates a computing device 110(1), such as a smartphone, to acquire an audio signal of human speech using an app running on the smartphone. For example, the user 112(1) may use the smartphone to record a meeting with colleagues. The app running on the smartphone acquires the audio signal and monitors the signal for speech transitions, such as pauses, changes in voice, or distinctive tones or patterns, for example. The app identifies any such speech transitions and treats them as boundaries between respective portions of human speech in the audio signal. Each portion of human speech is thus bounded on each side by a respective speech transition. For consistency, the beginning and end of the recording as a whole can each be regarded as a speech transition.

As the app running on the smartphone records the audio signal, the app can detect whether each portion of human speech meets a noteworthiness criterion. The noteworthiness criterion provides a standard for evaluating whether the currently recording audio portion should be identified as noteworthy, such that it may later be presented for selective playback.

In some examples, a user herself or himself may judge whether a currently recording audio portion is noteworthy and may indicate this judgment by performing a predetermined manual operation that the app running on the smartphone can detect. The predetermined manual operation may include any of a variety of operations, such as pushing or tapping a button, entering text, triggering a light sensor, triggering a proximity detector, reorienting the computing device to change the output of a gyroscope, tapping the computing device to change the output of an accelerometer, and so forth. Manual operations available for this purpose will depend on the type of computing device used and its particular features. Thus, a different set of operations may be available on a desktop computer than on a smartphone. Preferably, the manual operation is unambiguous and simple to perform, so that the user can perform the operation without becoming distracted. In some examples, the app is configured to accept any of a variety of predetermined manual operations as bases for detecting whether the noteworthiness criterion has been met, and the particular manual operations to be used may be specified in user-configurable settings. The app running on the smartphone may identify any number of portions of human speech in the audio signal as noteworthy, based on the number of different portions of human speech for which the app has detected the predetermined manual operation or operations.

In some examples, the app running on the smartphone may evaluate automatically whether a currently-recording audio portion is noteworthy. For example, the app may act alone or in cooperation with the server 130 to generate a set of audio characteristics of each currently-recording audio portion. The noteworthiness criteria may then be met when the set of audio characteristics are consistent with characteristics typical of audio portions known to be noteworthy. For example, it may be the case that longer audio segments tend to be more noteworthy than shorter ones. Thus, the duration of each portion of human speech may be used automatically to evaluate whether the noteworthiness criterion has been met. Similarly, speech having higher volume may be more noteworthy than speech having lower volume. Thus, the average power of each portion of human speech may be used automatically to evaluate noteworthiness. Likewise, certain voice patterns, such as rhythmic patterns, lowered tones, etc., may indicate a higher likelihood that the content spoken is noteworthy, such that the detection of such voice patterns may automatically indicate noteworthiness. In some examples, the app may transcribe audio on-the-fly and search for certain keywords in the spoken content. Keywords may be stored in a database and entered manually or automatically. In one example, the app running on the smartphone transcribes audio portions previously identified as noteworthy and builds a database of keywords appearing at high frequency in the transcribed text. The noteworthiness criteria can then be met for a currently-recording portion of human speech when it contains one or more of the prescribed keywords at a sufficient frequency.

When automatically evaluating whether the noteworthiness criterion has been met, the app may evaluate multiple characteristics, and results from different characteristics may be combined to produce an overall evaluation result. The overall result may be computed in any suitable manner, such as by a weighted sum of factors, fuzzy logic, neural nets, Beyesian logic, and so forth. Depending on the processing power of the computing device, as well as other factors, some of the processing burden of generating and evaluating audio characteristics may be performed in cooperation with the server 130. For example, the computing device may upload audio data to the processing services 138 on the server 130, which may perform the required processing and communicate results back to the computing device.

It should be understood that manual and automatic techniques for evaluating whether the noteworthiness criteria has been met may be used separately or together. For example, automatic evaluation for noteworthiness may proceed as an alternative to a manual technique or in addition to a manual technique.

Once the audio recording has been made, the app displays on the smartphone a list of noteworthy audio segments, i.e., portions of human speech for which the noteworthiness criterion has been met. In some examples, audio portions that fail to meet the noteworthiness criterion are not displayed, such that users do not have the option to replay them as distinct segments (users can still typically replay the entire recording, however). In some examples, noteworthy audio segments are displayed along a timeline in the order in which they were recorded. The user may navigate through the list to selectively play back any of the displayed noteworthy audio segments. When the user selects a segment for playback, the segment preferably starts playback of the noteworthy audio segment from its beginning. As each noteworthy audio segment begins and ends at a speech transition, each noteworthy audio segment typically includes an entire portion of the recording pertaining to a particular topic. Thus, users generally have no need to search through a recording to find the beginning or end of the relevant section. The entire portion of human speech is deemed noteworthy, regardless of the time within the segment when the noteworthiness criterion was met.

In some examples, the app running on the smartphone (or other device) includes features that allow the user to edit noteworthy audio segments. For example, the app presents user interface features that allow the user to trim audio segments to remove unwanted content from the noteworthy audio segments. For example, the user may navigate through a noteworthy audio segment and remove a portion at its beginning or end. In some examples, the app includes features that allow users to extend noteworthy audio segments to include additional context beyond the designated end of the segment and/or prior to its beginning. The app may also include features to allow the user to split a noteworthy audio segment into multiple segments, e.g., by the user navigating through the segment and inserting a break at a desired location. In addition, features may be included to merge a noteworthy audio segment with an adjacent audio segment, whether the adjacent audio segment was identified as noteworthy or not.

In some examples, the user may upload the audio recording to cloud storage 134 on the server 130, to back up the recording to the cloud and potentially to share the recording and associated content with other users over the network 120. In some examples, content uploaded to cloud storage 134 includes not only the recording itself but also metadata identifying speech transitions and noteworthy audio segments. Users can access the uploaded content via the webserver 132, for selectively playing back desired noteworthy audio segments. In some examples, users may append pictures, documents, and/or notes to an audio recording as it is being made, or later, and such content may be uploaded to the cloud storage 134 along with the recording to enable users to access the content along a timeline via the webserver 134.

Although the above example is based on the computing device being a smartphone, it is understood that the computing device may be of any type. Also, although the above example provides an app to perform the described recording and processing, it is understood that multiple apps, applications, programs, and/or services and the like may be employed for performing the described operations. Therefore, no particular hardware or software arrangement is required.

In another type of example operation, the technique hereof may be employed as part of a web conference or other collaborative session. For instance, the conferencing/collaboration server 136 may record the conference by combining audio from telephone or VOIP connections from the computing devices 110(1) to 110(5) and/or from telephones (not shown). The conferencing/collaboration server 136 can then perform the tasks of identifying speech transitions and identifying particular portions of human speech as noteworthy. For example, the conferencing/collaboration server 136 receives manual input from users 112(1) to 112(5) and identifies currently-recording portions of speech as noteworthy, e.g., in response to conference participants performing predetermined manual operations on their respective devices. In some examples, the conferencing/collaboration server 136 detects noteworthiness automatically, e.g., using the various audio characteristics identified above.

Some conferencing and/or collaboration systems have the ability to identify the person currently speaking, based, for example, on which line coming into the conference has the highest volume. Such systems can use the speaker's identity to further aid in identifying noteworthy content. For example, a particular participant may be a senior person for which everything the person says may be noteworthy. Systems may detect when the senior person is speaking for more than a few seconds and then identify the current audio portion as noteworthy.

Figure 2:
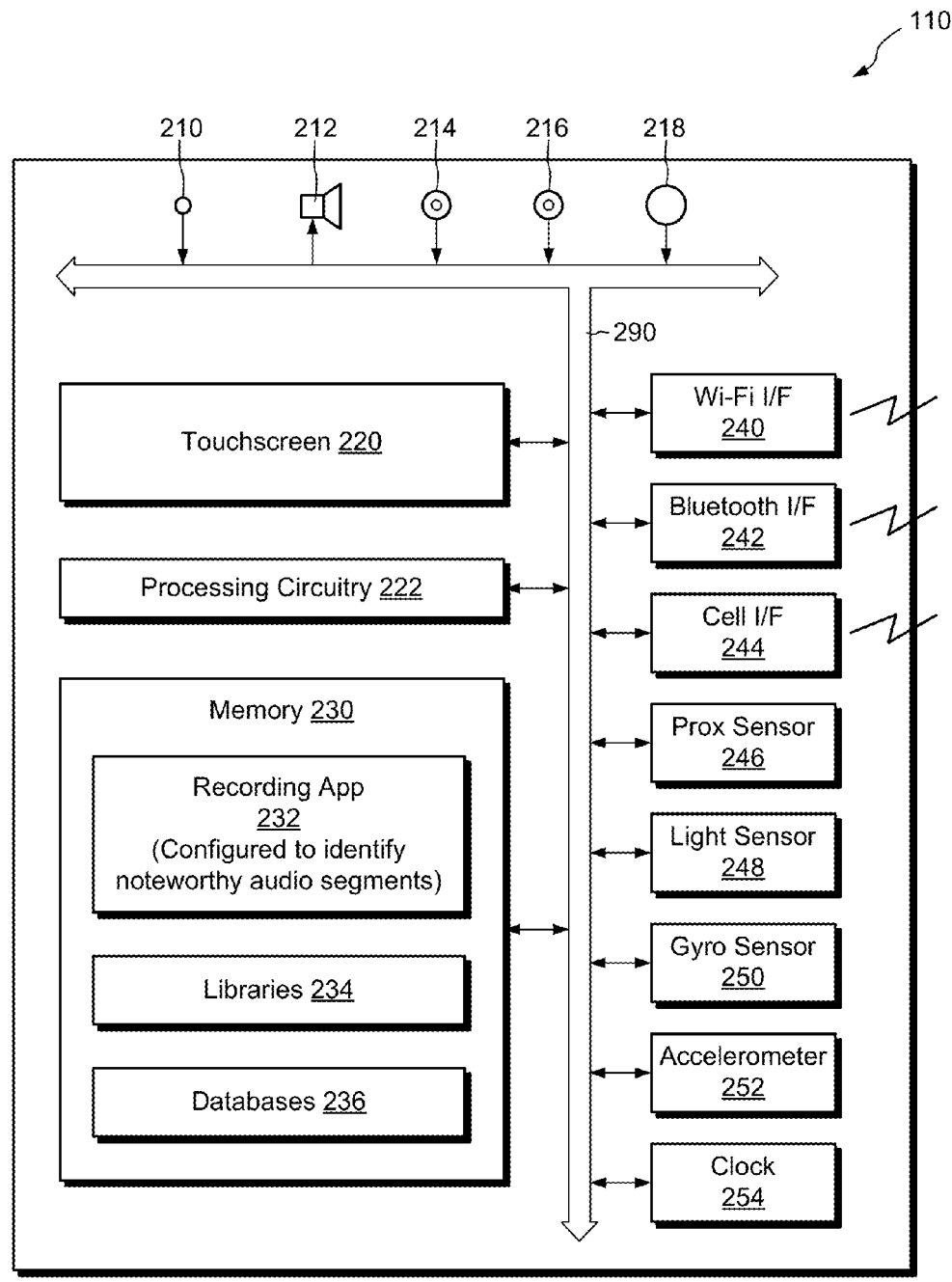
FIG. 2 is a block diagram of an example computing device for performing aspects of the improved technique hereof in the environment of FIG. 1.

FIG. 2 shows an example computing device 110 in additional detail. The computing device 110 is intended to be representative of the computing devices 110(1) to 110(5) of FIG. 1. However, it should be recognized that different computing devices may differ from one another. For example, some computing devices may be provided as smartphones, others may be provided as tablets, others may be provided as desktop computers, etc., with the different types of computing devices configured differently. In addition, different computing devices of the same type may be configured differently from one another. Thus, the details of the computing device 110 should be regarded as merely illustrative.

Here, it is seen that the computing device 110 includes a touchscreen 220, processing circuitry 222 (i.e., one or more processing chips and/or assemblies), and memory 230, which are interconnected by a bus 290 or a set of busses. The memory 230 includes both volatile memory (e.g., RAM) and non-volatile memory, such as one or more disk drives, solid state drives, and the like. The processing circuitry 222 and the memory 230 together form electronic circuitry, which is constructed and arranged to carry out various methods and functions as described herein. Also, the memory 230 includes a variety of software constructs realized in the form of executable instructions. When the executable instructions are run by the processing circuitry 222, the processing circuitry 222 is caused to carry out the operations of the software constructs. Although certain software constructs are specifically shown and described, it is understood that the memory 230 typically includes many other software constructs, which are not shown, such as an operating system and various applications, processes, and daemons.

As further shown in FIG. 2, the processing circuitry 222 is coupled over the bus 290 to various transducers, sensors, and interfaces. These include, for example, microphone 210, speaker 212, front-facing camera 214, rear-facing camera 216, and physical button 218. The transducers, sensors, and interfaces further include Wi-Fi (Wireless Fidelity) interface 240, Bluetooth interface 242, cell phone interface 244, proximity sensor 246, ambient light sensor 248, gyroscope sensor 250, accelerometer 252, and clock 254.

The memory 230 stores data for realizing a recording app 232, as well as various libraries 234 and databases 236. In an example, the recording app 232 is configured to record audio signals, to identify speech transitions in audio signals as they are being recorded, to identify noteworthy audio segments, and to perform other functions. Libraries 234 may provide APIs (application program interfaces) for accessing the various transducers, sensors, and interfaces, as well as for accessing other device and operating system features and capabilities. Databases 236 store settings of the recording app 232, as well as user profiles, keywords for use in automatically identifying noteworthy audio content, and any other data useful to the recording app 232.

In operation, the computing device 110 runs the recording app 232 to record audio signals acquired by the microphone 210. The computing device 110 may later play back recorded audio via the speaker 212. The computing device 110 may operate the camera 214 and/or 216 using the recording app 232 to take pictures, which the recording app 232 may append to a timeline of an audio recording and display, e.g., as thumbnails along the recording's timeline. The computing device 110 may communicate over the network 120 with other computing devices and with the server 130 via Wi-Fi interface 240, Bluetooth interface 242, and/or cell phone interface 244.

To identify noteworthy audio segments in response to predetermined manual operations, the computing device 110 may detect button presses of the button 218, or button taps or other inputs made on the touchscreen 220 (or other input device). The computing device 110 may detect activation of the proximity detector 246, such as in response to the user waving her hand near the proximity detector 246 or turning the computing device 110 on its face to cover the proximity detector 246. Similarly, the computing device 110 may detect changes in output of the ambient light sensor 248, which may occur when the user momentarily covers the sensor 248. In a similar manner, the computing device 110 may detect changes in output of the gyroscope sensor 250, reflecting a manual change in orientation of the computing device 110, or may detect sudden movement via a change in output from the accelerometer 252, which may occur, for example, in response to the user tapping the computing device 110 against a solid surface. Thus, the computing device 110 may detect a wide variety of manual operations to indicate noteworthy audio segments.

Figure 3:
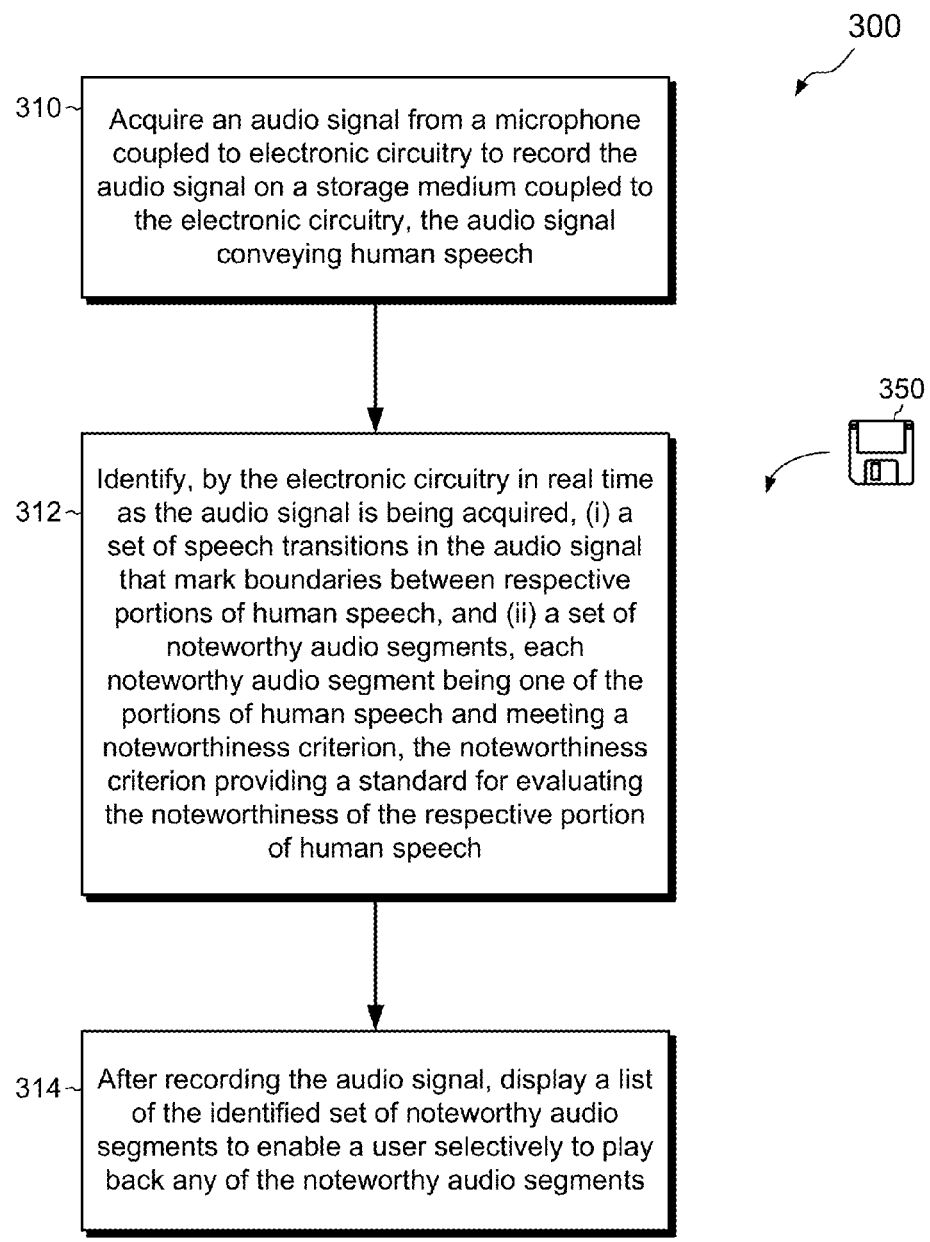
FIG. 3 is a flowchart showing an example method for recording human speech using the computing device of FIG. 2 in the environment of FIG. 1.
Figure 4:
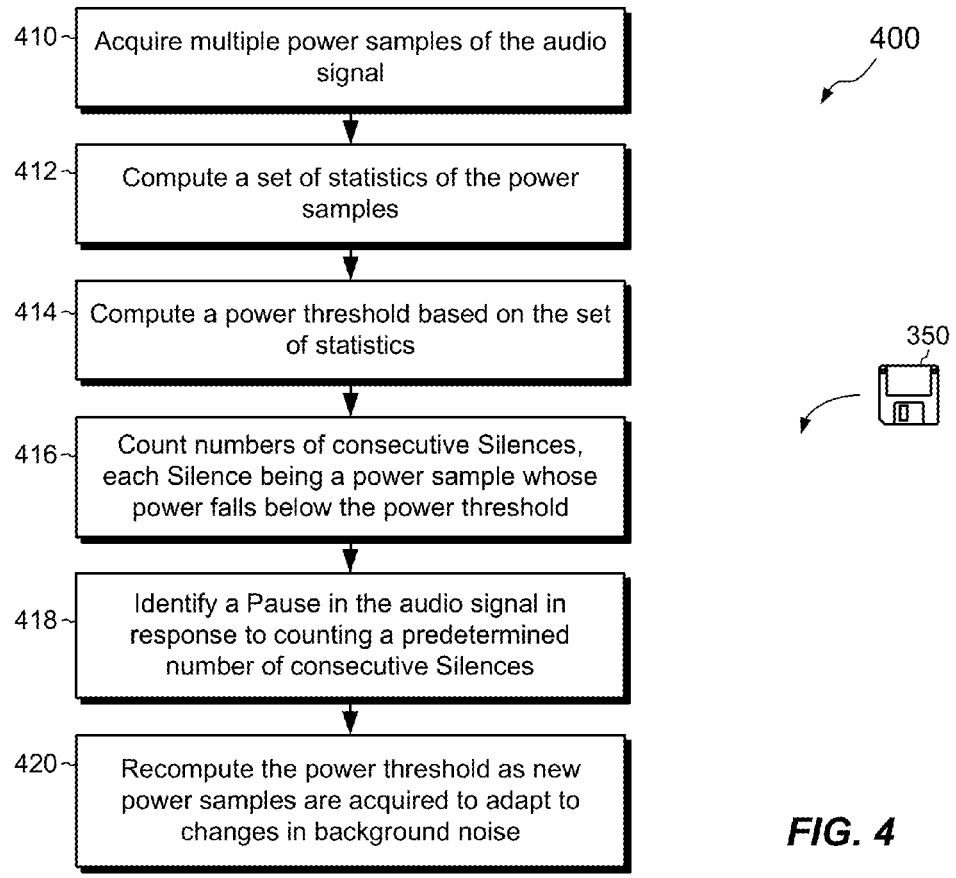
FIG. 4 is a flowchart showing an example method of identifying speech transitions in an audio signal as part of the process of FIG. 3.

FIGS. 3 and 4 show processes 300 and 400 that may be carried out in connection with the computing environment 100. These processes are typically performed by the software constructs described in connection with FIG. 2, which reside in the memory 230 of the computing device 110 and are run by the set of processors 222. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 3 shows an example process 300 for recording human speech. In an example, the process 300 is initiated by a user operating the recording app 232 on the computing device 110.

At 310, an audio signal conveying human speech is acquired from a microphone. The microphone is coupled to electronic circuitry to record the audio signal on a storage medium coupled to the electronic circuitry. For example, the microphone 210 (FIG. 2) acquires an audio signal that conveys human speech from any number of speakers. The audio signal may include other noises besides human speech, such as background noise, for example. Electronic circuitry including the processing circuitry 222 and memory 230 that realize the recording app 232, direct the audio signal to be stored on a storage medium, such as in the memory 230 itself or on some other storage medium, which may be local to the computing device 110 or remote (e.g., connected over the network 120).

At 312, the electronic circuitry identifies, in real time as the audio signal is being acquired, (i) a set of speech transitions in the audio signal that mark boundaries between respective portions of human speech, and (ii) a set of noteworthy audio segments. Each noteworthy audio segment is one of the portions of human speech and meets a noteworthiness criterion. The noteworthiness criterion provides a standard for evaluating the noteworthiness of the respective portion of human speech. For example, the recording app 232 monitors the audio signal for pauses, changes in tone, changes in the person speaking, and/or other speech transitions and creates metadata to mark the time at which each speech transition occurs. While recording each portion of human speech, the recording app 232 monitors whether a noteworthiness criterion has been met. The noteworthiness criterion may be met, for example, in response to the user performing some predetermined manual operation. The noteworthiness criterion may also (or alternatively) be met automatically, such as by the recording app 232 generating and evaluating audio characteristics of each current portion of human speech. When the noteworthiness criterion for a particular portion of human speech is met, the recording app 232 may create metadata that identifies the portion of human speech as noteworthy.

At 314, after recording the audio signal, a list is displayed of the identified set of noteworthy audio segments, to enable a user selectively to play back any of the noteworthy audio segments. For example, the recording app 232 may display a list of noteworthy audio segments on the touchscreen 220 (or other display), and the user may tap on (or otherwise select) any of the displayed audio segments for selective playback. When an audio segment is selected, it is preferably played back from its beginning, such that playback of the audio segment begins at the speech transition immediately preceding the time when the recording app 232 recognized that the noteworthiness criterion was met, and ends at the speech transition immediately following the time when the recording app 232 recognized that the noteworthiness criterion was met.

FIG. 4 shows an example process 400 for identifying speech transitions in an audio signal and thus provides an example of certain aspects of step 312 of FIG. 3 in additional detail. In an example, the process 400 is performed automatically by the recording app 232 when recording an audio signal.

At 410, multiple power samples of the audio signal are acquired. For example, the recording app 232 may access an API of the microphone 210 to acquire multiple consecutive samples of the amplitude of the audio signal. The recording app 232 may then compute the square of each amplitude sample to obtain a respective power sample. Alternatively, and depending on the capabilities of the microphone's API, the recording app 232 may obtain power samples directly. In an example, the recording app 232 obtains a new power sample once every 30 milliseconds from the API of the microphone 210. Each power sample represents the average power of the audio signal over the preceding 30 millisecond interval.

At 412, a set of statistics of the power samples are computed. In some examples, the recording app 232 computes a mean and a standard deviation of the power samples. In other examples, other centrality measures are used besides mean, such as median, mode, and so forth. Further, other measures of spread besides standard deviation may be used, such as absolute deviation or inter-quartile range, for example. If the acquired power samples are found to be multi-modal (e.g., to have multiple peaks), the app can identify a dominant peak, with other peaks considered as noise. Measures of centrality and/or spread may then be computed based on the dominant peak.

At 414, a power threshold is computed based on the set of statistics. For example, where the set of statistics includes a mean and a standard deviation, the power threshold may be established as a predetermined number of standard deviations (e.g., between 2 and 5) below the mean. In an example, the power threshold may be established as a user-adjustable parameter.

At 416, a number of consecutive Silences is counted, with each Silence being a power sample whose power falls below the power threshold. Consecutive Silences indicate a sustained period of quiet relative to background noise.

At 418, a Pause is identified as a predetermined number of consecutive Silences. In an example, Pauses indicate speech transitions, under the assumption that longer periods of quiet correspond to changes in content being discussed. In an example, the number of consecutive Silences required to establish a Pause, and thus a speech transition, may be received as a user-adjustable parameter. Such number of Silences may range, for example, between about 5 and 200, corresponding to periods of silence ranging from about 150 milliseconds to about 6 seconds (assuming samples are acquired at 30-millisecond intervals).

At 420, the power threshold is recomputed as new power samples are acquired to adapt to changes in background noise. For example, background noise may change over the course of a recording as new power samples are acquired. To account for these changes, the recording app 232 may recompute the power threshold to weigh more heavily recently acquired power samples than older samples. For example, the recording app 232 may apply a fixed-length sampling window to power samples, where the sampling window includes recently acquired samples but excludes older samples. The recording app 232 may then recompute the set of statistics and the power threshold on some regular basis, such as every second, every minute, etc., as new samples are acquired and the sampling window moves forward in time. In this manner, the power threshold is adjusted based on changes in background noise, thereby promoting greater reliability in identifying speech transitions.

Figure 5:
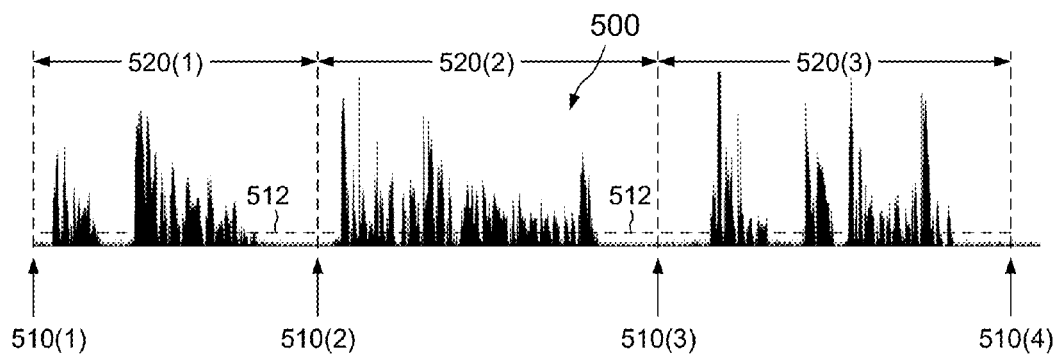
FIG. 5 is a graphical depiction of power samples of an audio signal from which speech transitions can be identified.

FIG. 5 shows an example series 500 of consecutive power samples of an audio signal acquired, for example, using the recording app 232 running on the computing device 110. Here, it is seen that speech transitions 510(1) and 510(4) are assumed at the beginning and end of the recording and that speech transitions 510(2) and 510(3) are identified during quiet periods, e.g., after some predetermined number of consecutive power samples fall below a power threshold 512. The speech transitions 510(1) to 510(4) mark boundaries between portions of human speech, which are identified as portions 520(1), 520(2), and 520(3). Any of the portions 520(1), 520(2), and 520(3) qualify as noteworthy audio segments if they meet the noteworthiness criterion. Otherwise, they do not qualify as noteworthy audio segments.

FIGS. 6-17 show example screenshots of a particular implementation of the recording app 232 as it is operated to record an audio signal. In the implementation shown, the recording app 232 runs on a smartphone (e.g., an iPhone). It should be understood, however, that the recording app 232 may be run on any type of computing device or computing platform.

Figure 6:
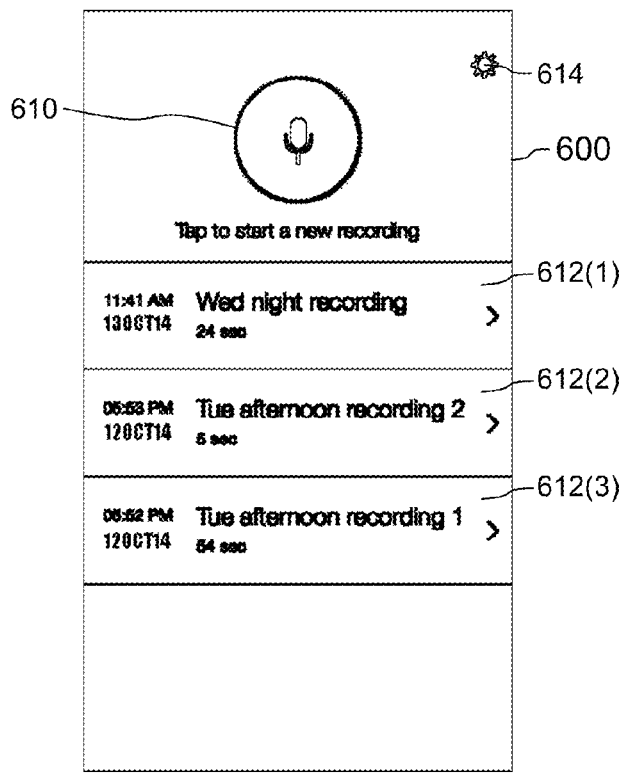
FIGS. 6-17 are example screen shots of an example app running on a computing device configured to perform aspects of the improved technique hereof.

FIG. 6 shows an example screenshot 600 of the recording app 232 as it appears when it is first launched. For example, a user may launch the recording app 232 by tapping an icon on the user's home screen. The screenshot 600 is seen to include a button 610, which the user may "tap to start a new recording." The screenshot 600 also displays a list of entries 612(1), 612(2), and 612(3) that indicate previously made recordings. Each recording has a default title (which may be changed by the user) that indicates when the recording was made (e.g., "Wed night recording") and lists the time, date, and duration of the recording. When the user taps an entry, the recording app 232 displays details of the recording to allow playback of its noteworthy audio segments. A settings control 614 shown at the top of the screenshot 600 may be tapped to establish settings of the recording app 232. The settings may include, for example, a location to which recordings may be synced (such as the cloud storage 134), as well as user profiles, keywords, and so forth.

Figure 7:
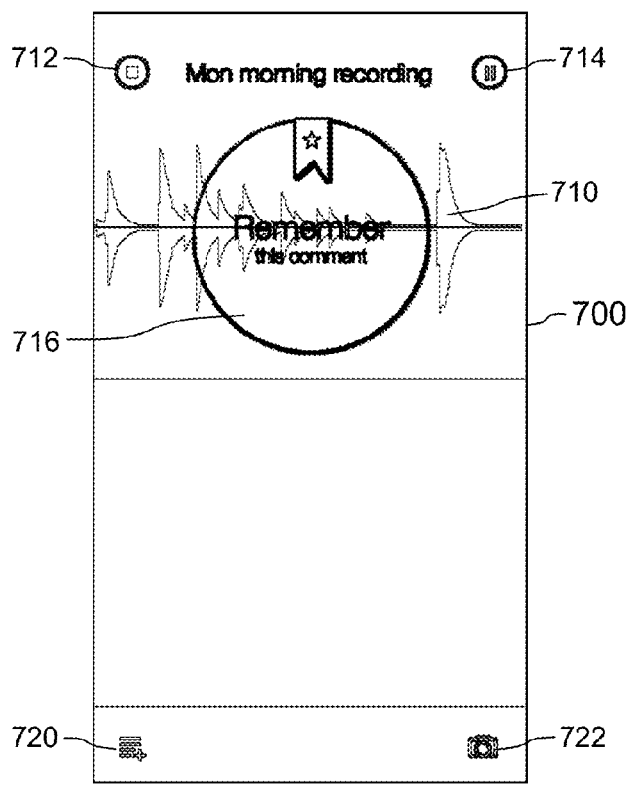

FIG. 7 shows an example screenshot 700 of the recording app 232, which the recording app 232 may display in response to the user tapping the button 612 to start a new recording. Here, the recording app 232 has begun recording the audio signal and displays a live audio waveform 710. The user may stop the recording by tapping button 712 or may pause/resume the recording by tapping button 714. Once the recording app 232 begins recording, the recording app 232 begins automatically detecting speech transitions (e.g., Pauses) in the audio signal and monitoring whether the noteworthiness criterion has been met. In this particular example, the user can tap button 716 to "Remember this comment" and thereby indicate that the currently recording portion of audio is noteworthy. The screenshot 700 also includes a button 720 to add a note to the timeline of the current recording and a button 722 to add a picture or photo to the timeline of the current recording.

Figure 8:
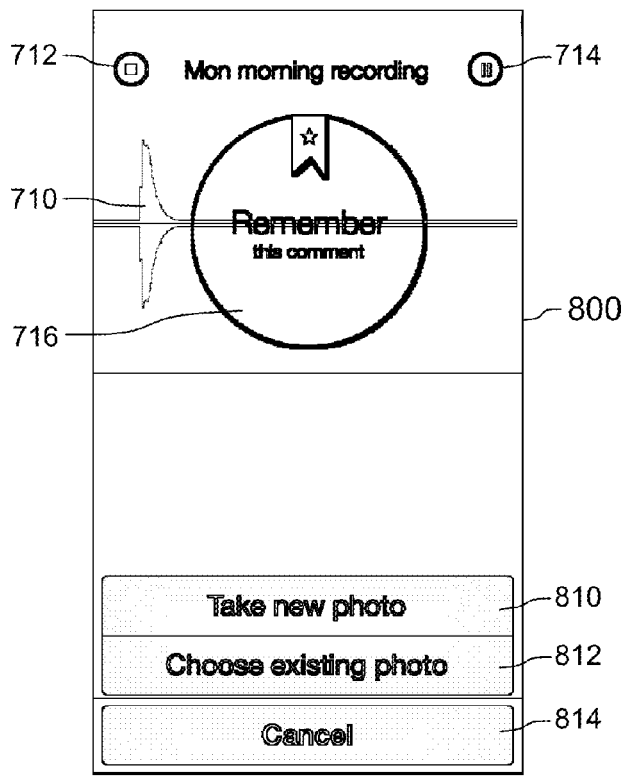

FIG. 8 shows an example screenshot 800 of the recording app 232, which the recording app 232 may display in response to the user tapping the button 722 on screen 700 to add a picture or photo. Here, the recording app 232 displays options 810, 812, and 814, respectively to "Take new photo," "Choose existing photo," or "Cancel." The user may tap option 810 to take a new photo, whereupon the recording app 232 turns on the camera 214 or 216 (FIG. 2) and allows the user to take a new photo. The user may alternatively tap option 812 to manually add an existing photo, e.g., from the user's camera roll. The user may also tap option 814, whereupon no action is taken and the screen returns to that shown in FIG. 7.

Figure 9:
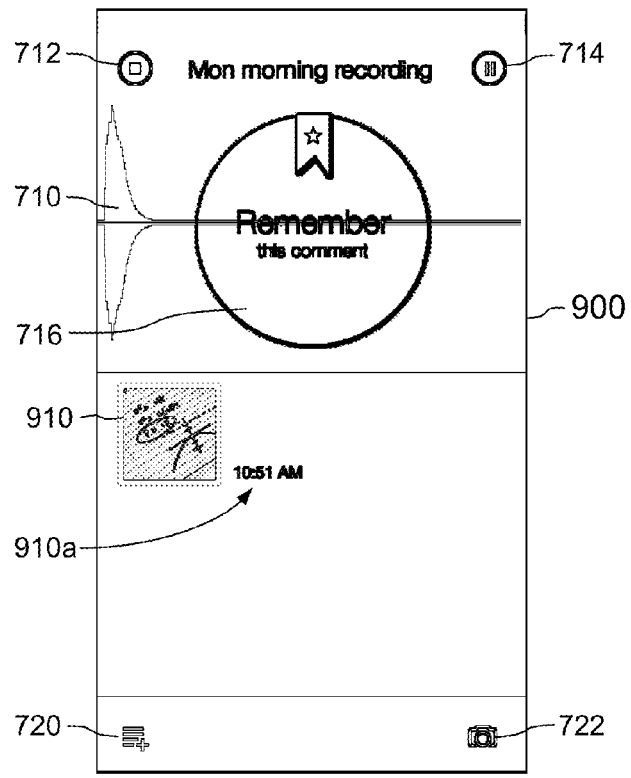

FIG. 9 shows an example screenshot 900 of the recording app 232, which the recording app 232 may display after the user takes a new photo (option 810) or chooses an existing photo (option 812). Here, the recording app 232 displays a thumbnail 910 of the added photo, as well as the time 910a when the photo was added.

Figure 10:
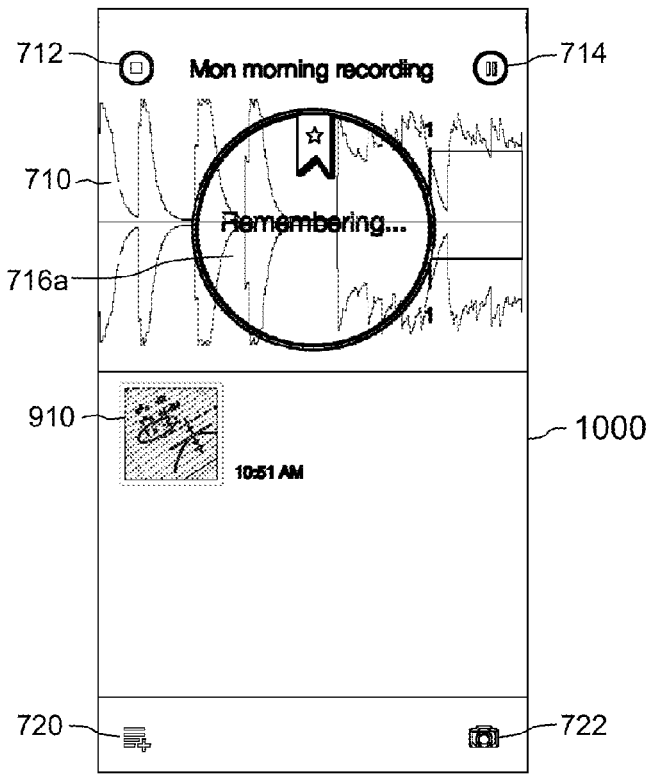

FIG. 10 shows an example screenshot 1000 of the recording app 232, which the recording app 232 may display in response to the user tapping the button 716 to "Remember this comment." The screenshot 1000 replaces button 716 with label 716a, which indicates that the recording app 232 is "Remembering" the current audio portion. By receiving the tap of button 716 (FIG. 7), the recording app 232 deems the noteworthiness criterion to have been met and marks the currently recording portion of human speech as noteworthy. The screen continues to display the label 716a to indicate that the recording app 232 continues to be "Remembering" the current audio portion until the next speech transition occurs. When the next portion of human speech begins, the screen displays the button 716, once again to provide the user with the option to "Remember this comment," i.e., the new current portion of human speech.

Figure 11:
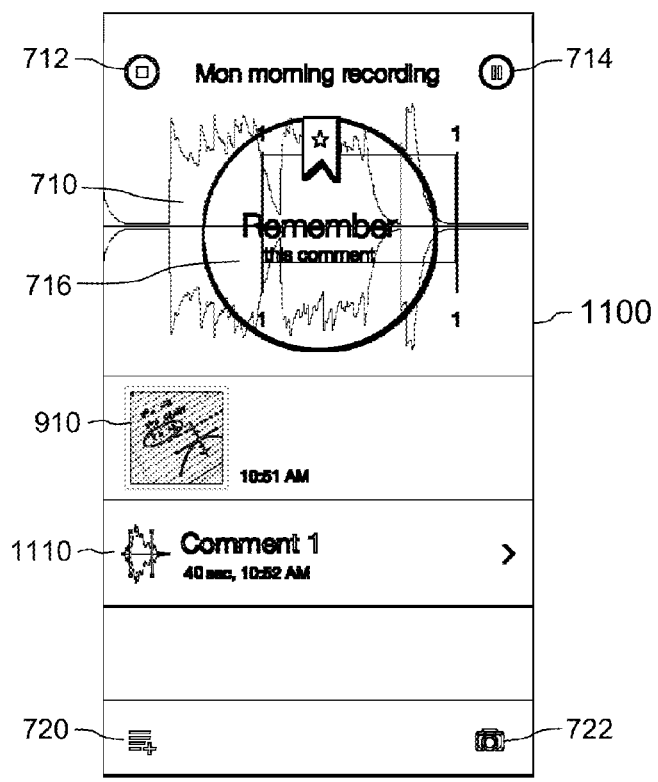

FIG. 11 shows an example screenshot 1100 of the recording app 232, which the recording app 232 may display after "Remembering" the audio portion described in connection with FIG. 10. Here, the screenshot 110 includes an entry 1110 named "Comment 1," which indicates the duration of the noteworthy audio segment just "remembered" and the time when the audio segment began. The screenshot 1100 displays the entry 1110 beneath the thumbnail 910, as it was acquired after the picture indicated by the thumbnail was added, i.e. the recording app 232 displays entries in chronological order.

Figure 12:
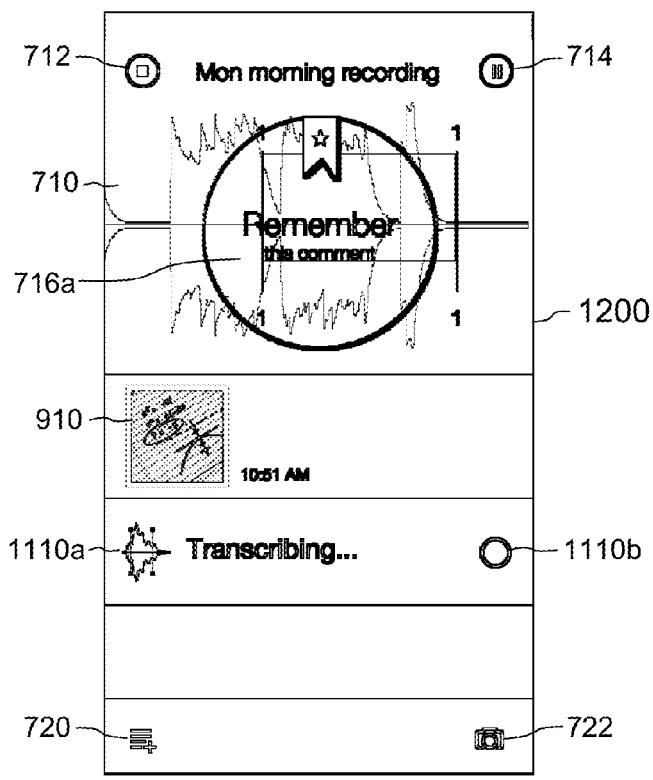

FIG. 12 shows an example screenshot 1200 of the recording app 232, which the recording app 232 may display in response to the user tapping entry 1110 in FIG. 11. Here, the entry 1110 changes to entry 1110a to indicate that recording app 232 is "Transcribing" the noteworthy audio segment "Comment 1." The screenshot 1200 also displays a progress ring 1110b to indicate progress in transcribing Comment 1. The recording app 232 may transcribe noteworthy audio segments locally, e.g., using speech recognition software installed on the computing device. Alternatively (and particularly for smartphone implementations), the recording app 232 may transmit the noteworthy audio segments to the processing services 138 on the server 130. In such cases, the server 130 transcribes the audio and returns corresponding text to the recording app 232. In some examples, such as that shown, noteworthy audio segments are transcribed only after the user taps the entry 1110. In other examples, transcription may begin automatically, such as immediately after the noteworthy audio segment has been captured.

Figure 13:
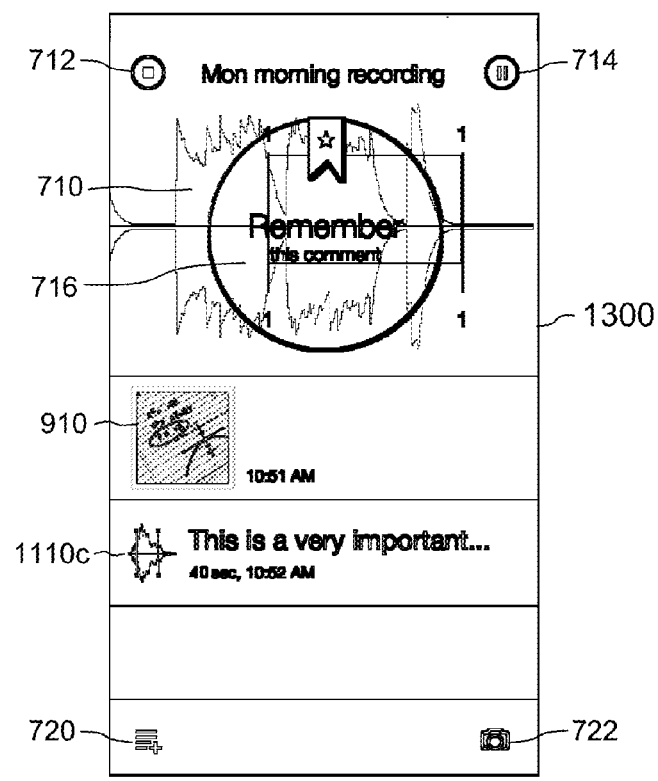

FIG. 13 shows an example screenshot 1300 of the recording app 232, which the recording app 232 may display once the noteworthy audio segment has been transcribed. Here, the screenshot 1300 replaces the entry 1110a with the entry 1110c, which displays a beginning portion of the transcribed text. The user may tap on the entry 1110c to display the entirety of the transcribed text.

Figure 14:
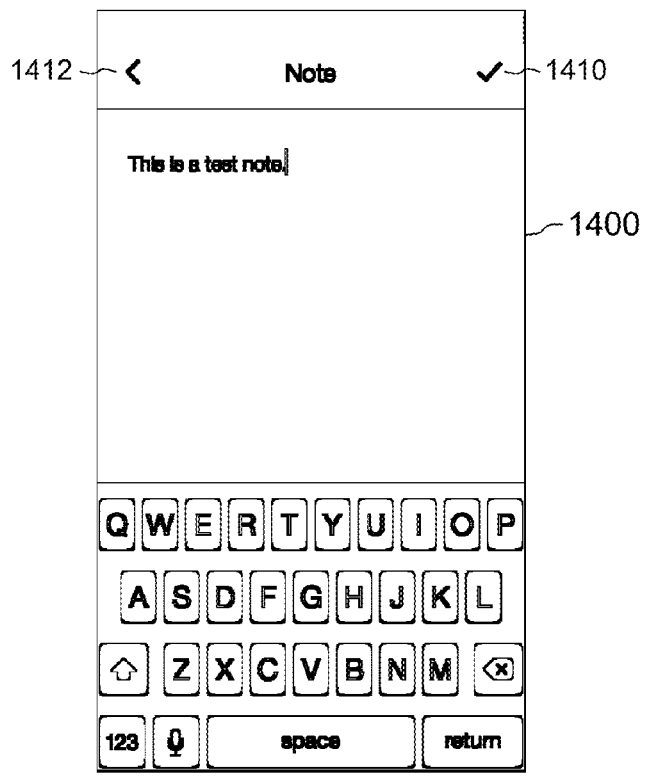

FIG. 14 shows an example screenshot 1400 of the recording app 232, which the recording app 232 may display in response to the user tapping the button 720 (FIG. 7) to add a note. Here, the user may manually enter a note while the recording proceeds. The user may accept the typed note by tapping the checkmark 1410 or may cancel by tapping the arrow 1412.

Figure 15:
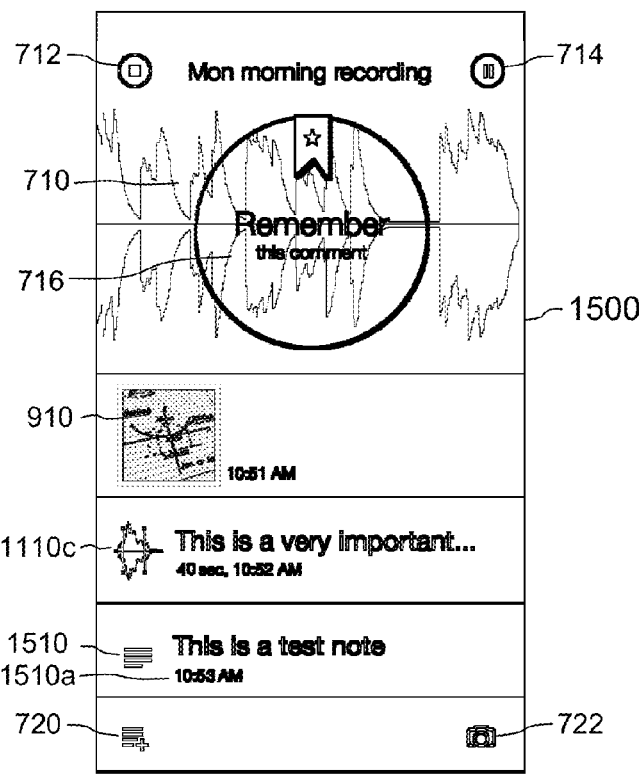

FIG. 15 shows an example screenshot 1500 of the recording app 232, which the recording app 232 may display in response to the user tapping the checkmark 1410 (FIG. 14) to accept the typed note. Here, the recording app 232 displays a beginning portion of the note (in this case, the entire note) in entry 1510. The recording app 232 also displays the time 1510a when the note was entered. The recording app 232 displays the newly added note in chronological order with other entries.

Although the screenshots shown in FIGS. 6-15 show only a single picture, a single noteworthy audio segment, and a single note, it should be understood that the recording app 232 may list any number of pictures, noteworthy audio segments, and/or notes. The recording app 232 may list all such entries in chronological order.

Figure 16:
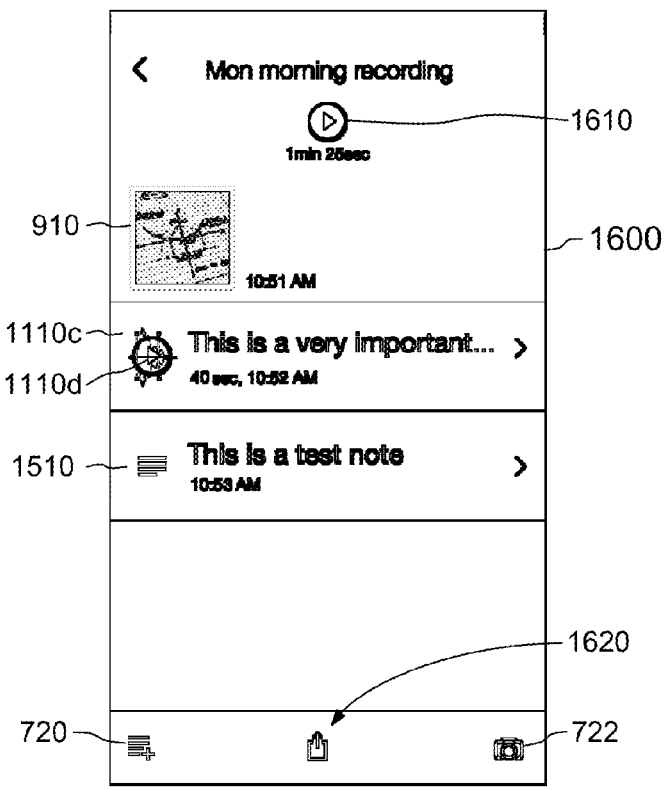

FIG. 16 shows an example screenshot 1600 of the recording app 232, which the recording app 232 may display in response to the user tapping the button 712 (FIG. 7) to end the current recording. Here, the recording app 232 includes a button 1610 to play back the entire recording, e.g., from beginning to end. The screenshot 1600 also displays the previously described entries 710, 1110c, and 1510. In general, the recording app 232 displays, in chronological order, all pictures, noteworthy audio segments, and notes. Users may tap entries for pictures (like 910) to open the pictures for full-screen viewing. Users may also tap entries for notes (like 1510) to open notes for full-screen viewing. Users may tap entries for any of the noteworthy audio segments (like 1110c) to view transcribed text of the respective noteworthy audio segment. In some examples, users may edit transcribed text to correct transcription errors, to add notes, and so forth. Users may tap button 1110d to play back the audio of the respective noteworthy audio segment. In response to tapping the button 1110d, the recording app 232 plays back the noteworthy audio segment from beginning to end. The screenshot 1600 also includes a button 1620 for sharing the current recording. In some examples, the recording app 232 automatically uploads the current recording, including all pictures, noteworthy audio segments, and notes, to the cloud storage 134 in response to the user tapping the button 1620. Tapping the button 1620 also causes the recording app 232 to display additional sharing options.

Figure 17:
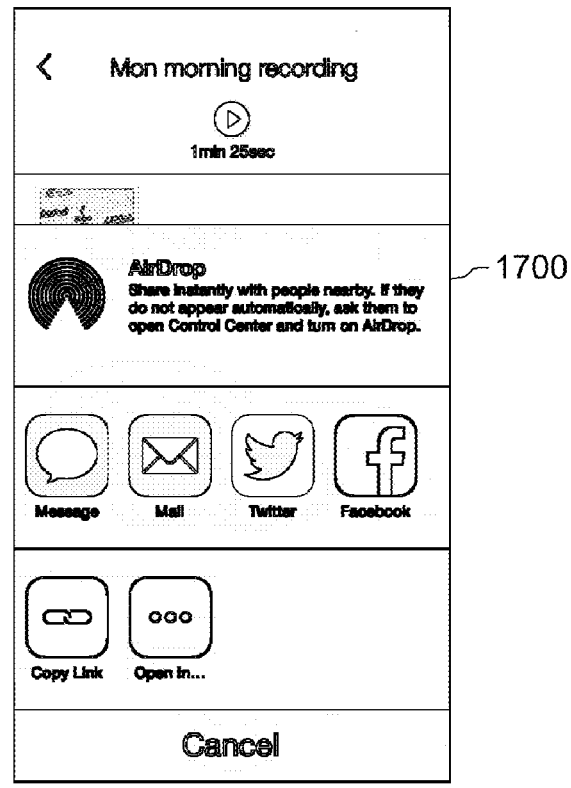

FIG. 17 shows an example screenshot 1700 of the recording app 232, which the recording app 232 may display in response to the user tapping the button 1620 (FIG. 16). Here, standard sharing options are displayed, such as options to share with another user via AirDrop, or to share via SMS, email, Twitter, or Facebook. The user may also copy a link to the recording on cloud storage 134 (using "Copy Link") and share the link with other users. The user may further open the link (using "Open In . . . ") in another app, such as a browser.

Figure 18:
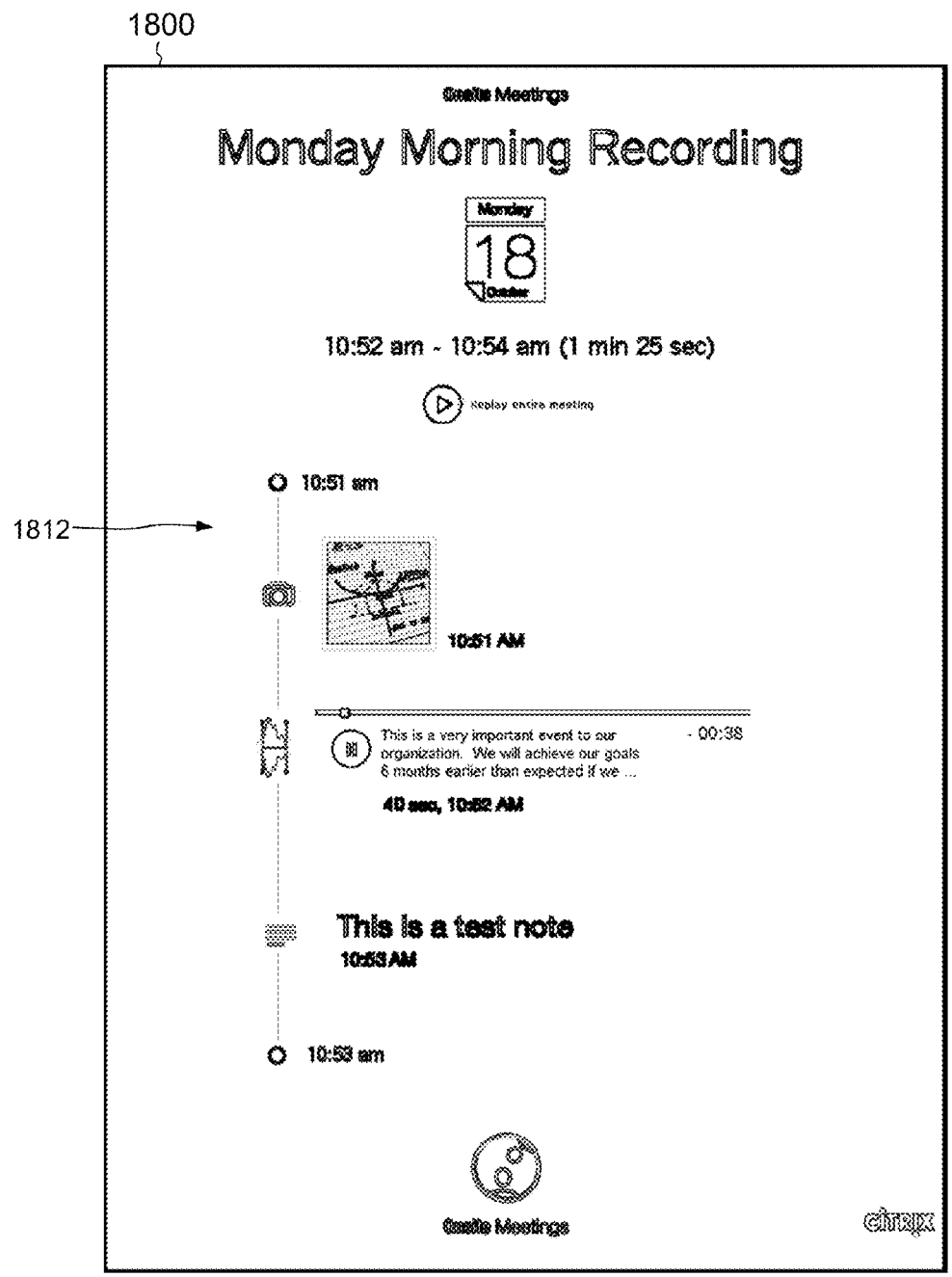
FIG. 18 is an example screen shot provided by a server with which an audio recording acquired using the computing device of FIG. 2 has been shared.

FIG. 18 shows an example screenshot 1800 of the recording described above. Here, however, the recording has been uploaded to the cloud storage 134 and has been displayed to a web client via the webserver 132. For example, users receiving copies of the link to the recording may open the link in a browser to display the screenshot 1800. As shown, the screenshot 1800 displays the recording on a timeline 1812, including all pictures, notes, and noteworthy audio segments. Users may play back selected noteworthy audio segments individually and view transcribed text. Users may also play back the entire recording from beginning to end. Users may click thumbnails of pictures to display the pictures at full size, and may click notes to view them in their entirety.

An improved technique has been described for recording dictation, meetings, lectures, and other events. The technique includes automatically segmenting an audio recording into portions by detecting speech transitions within the recording and selectively identifying certain portions of the recording as noteworthy. Noteworthy audio portions are displayed to a user for selective playback. The user can navigate to different noteworthy audio portions while ignoring other portions. Each noteworthy audio portion starts and ends with a speech transition. Thus, the improved technique typically captures noteworthy topics from beginning to end, thereby reducing or avoiding the need for users to have to search for the beginnings and ends of relevant topics manually.

Having described certain embodiments, numerous alternative embodiments or variations can be made. For example, although the disclosed embodiments pertain to human speech, the principles of the invention hereof may also be applied to other sounds, such as music, for example.

Also, it has been described that speech transitions and noteworthy audio segments are identified in real time, on the fly, as a recording is being obtained. However, the techniques disclosed may also be applied to pre-recorded audio.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 350 in FIGS. 3 and 4). Multiple computer-readable media may be used. The medium (or media) may be encoded with instructions which, when executed on one or more computers or other processing circuitry, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of recording human speech, the method comprising:
    acquiring, from a microphone coupled to electronic circuitry, an audio signal that conveys human speech;
    identifying, by the electronic circuitry and in real time as the audio signal is being acquired, (i) a set of speech transitions in the audio signal that mark boundaries between respective portions of human speech, and (ii) a set of noteworthy audio segments, each noteworthy audio segment being one of the portions of human speech and meeting a noteworthiness criterion, the noteworthiness criterion providing a standard for evaluating noteworthiness of portions of human speech; and
    after recording the audio signal, displaying a list of the identified set of noteworthy audio segments, the list enabling a user selectively to play back any of the noteworthy audio segments,
    wherein identifying the set of speech transitions in the audio signal includes (i) detecting Pauses in human speech in the audio signal that exceed a predetermined interval of time and (ii) marking speech transitions at times relative to the audio signal when the Pauses occur, and
    wherein detecting Pauses in human speech in the audio signal includes:
        acquiring multiple power samples of the audio signal;
        computing a set of statistics of the power samples;
        computing a power threshold based on the set of statistics;
        counting numbers of consecutive Silences, each Silence being a power sample whose power falls below the power threshold; and
        identifying a Pause in the audio signal, in response to counting a predetermined number of consecutive Silences.

2. The method of claim 1, wherein each noteworthy audio segment begins at a speech transition preceding a time when the noteworthiness criterion is met and wherein each noteworthy audio segment ends at a speech transition following the time when the noteworthiness criterion is met.

3. The method of claim 2, wherein displaying the list of the identified set of noteworthy audio segments presents the noteworthy audio segments in order of time that the noteworthy audio segments were recorded, and wherein the method further comprises:
    accepting, from the user, a selection of any noteworthy audio segment from the displayed list of noteworthy audio segments; and
    in response to accepting the selection, playing back the selected noteworthy audio segment from a beginning of the selected noteworthy audio segment.

4. The method of claim 3, further comprising, when displaying the list of noteworthy audio segments, displaying no portions of human speech besides the noteworthy audio segments, such that the user is unable selectively to play back any portions of human speech that fail to meet the noteworthiness criterion.

5. The method of claim 3, wherein the noteworthiness criterion is met, for at least one of the portions of human speech, in response to the electronic circuitry detecting, while each such portion of human speech is being acquired, a predetermined manual operation performed by the user.

6. The method of claim 5, wherein detecting the predetermined manual operation performed by the user includes the electronic circuitry detecting at least one of (i) a predetermined user input, (ii) a triggering of a proximity detector, (iii) a change in output of a light sensor, (vi) a change in output of an accelerometer, and (vii) a change in output of a gyroscope.

7. The method of claim 3, further comprising, for at least one of the portions of human speech:
    processing a corresponding portion of human speech as it is being acquired, wherein processing the corresponding portion of human speech generates a set of audio characteristics of the corresponding portion of human speech;
    wherein the noteworthiness criterion is met for the corresponding portion of human speech when the generated set of audio characteristics is consistent with audio characteristics of noteworthy audio content.

8. The method of claim 7, wherein the set of audio characteristics generated for each of the portions of human speech includes at least one of (i) a duration of an associated portion of human speech, (ii) an average power of the associated portion of human speech, (iii) one or more keywords transcribed from the associated portion of human speech, and (iv) a voice pattern assessment.

9. The method of claim 3, wherein the electronic circuitry is provided as part of a computing device connected to a computing network, and wherein the method further comprises:
storing (i) metadata that identifies the set of speech transitions and (ii) the set of noteworthy audio segments; and
uploading the recorded audio signal and the stored metadata to a server connected to the computing device over the network, wherein uploading the recorded audio enables the set of noteworthy audio segments to be shared over the network with other users.

10. The method of claim 9, wherein the computing device is a smartphone, and wherein uploading the recorded audio signal and the stored metadata to the server is performed, by an app running on the smartphone, in response to registering a single tap on a button displayed on the smartphone.

11. The method of claim 1, wherein detecting pauses in human speech in the audio signal further includes:
acquiring, over time, new power samples; and
adapting to changes in background noise by recomputing the power threshold as new power samples are acquired.

12. The method of claim 11, further comprising receiving the predetermined number of consecutive Silences as a user-adjustable parameter.

13. The method of claim 1,
wherein the electronic circuitry and the microphone are embodied together in a mobile computing device, the mobile computing device running an app, the app directing the acts of acquiring, identifying, and displaying, and
wherein the noteworthiness criterion is met, for a particular portion of the human speech, in response to (i) the app displaying a button on a display of the mobile computing device and while the particular portion of human speech is being acquired, and (ii) the app registering, while the particular portion of human speech is being acquired, an activation of the button.

14. A computing device, comprising:
electronic circuitry including processing circuitry and memory, the memory coupled to the processing circuitry and storing executable instructions which, when executed by the processing circuitry, cause the processing circuitry to:
acquire, from a microphone coupled to the electronic circuitry, an audio signal that conveys human speech;
identify, by the electronic circuitry and in real time as the audio signal is being acquired, (i) a set of speech transitions in the audio signal that mark boundaries between respective portions of human speech, and (ii) a set of noteworthy audio segments, each noteworthy audio segment being one of the portions of human speech and meeting a noteworthiness criterion, the noteworthiness criterion providing a standard for evaluating noteworthiness of portions of human speech; and
after recording the audio signal, display a list of the identified set of noteworthy audio segments, the list enabling a user selectively to play back any of the noteworthy audio segments,
wherein, when caused to identify the set of speech transitions in the audio signal, the processing circuitry is further caused to (i) detect Pauses in human speech in the audio signal that exceed a predetermined interval of time and (ii) mark speech transitions at times relative to the audio signal when the Pauses occur, and
wherein, when caused to detect Pauses in human speech in the audio signal, the processing circuit is further caused to:
acquire multiple power samples of the audio signal;
compute a set of statistics of the power samples;
compute a power threshold based on the set of statistics;
count numbers of consecutive Silences, each Silence being a power sample whose power falls below the power threshold; and
identify a Pause in the audio signal, in response to counting a predetermined number of consecutive Silences.

15. A computer program product including a non-transitory computer-readable medium having instructions which, when executed by processing circuitry, cause the processing circuitry to perform a method for recording human speech, the method comprising:
acquiring, from a microphone, an audio signal that conveys human speech;
identifying, by the electronic circuitry and in real time as the audio signal is being acquired, (i) a set of speech transitions in the audio signal that mark boundaries between respective portions of human speech, and (ii) a set of noteworthy audio segments, each noteworthy audio segment being one of the portions of human speech and meeting a noteworthiness criterion, the noteworthiness criterion providing a standard for evaluating noteworthiness of portions of human speech; and
after recording the audio signal, displaying a list of the identified set of noteworthy audio segments, the list enabling a user selectively to play back any of the noteworthy audio segments,
wherein identifying the set of speech transitions in the audio signal includes (i) detecting Pauses in human speech in the audio signal that exceed a predetermined interval of time and (ii) marking speech transitions at times relative to the audio signal when the Pauses occur, and
wherein detecting Pauses in human speech in the audio signal includes:
acquiring multiple power samples of the audio signal;
computing a set of statistics of the power samples;
computing a power threshold based on the set of statistics;
counting numbers of consecutive Silences, each Silence being a power sample whose power falls below the power threshold; and
identifying a Pause in the audio signal, in response to counting a predetermined number of consecutive Silences.

16. The computer program product of claim 15, wherein displaying the list of the identified set of noteworthy audio segments presents the noteworthy audio segments in order of time that the noteworthy audio segments were recorded, and wherein the method further comprises:
accepting, from the user, a selection of any noteworthy audio segment from the displayed list of noteworthy audio segments; and
in response to accepting the selection, playing back the selected noteworthy audio segment from a beginning of the selected noteworthy audio segment.

17. The computer program product of claim 16, wherein the noteworthiness criterion is met, for at least one of the portions of human speech, in response to the electronic circuitry detecting, while each such portion of human speech is being acquired, a predetermined manual operation performed by the user.

18. The computer program product of claim 16, wherein the method further comprises, for at least one of the portions of human speech:
- processing a corresponding portion of human speech as it is being acquired, wherein processing the corresponding portion of human speech generates a set of audio characteristics of the corresponding portion of human speech;
- wherein the noteworthiness criterion is met for the corresponding portion of human speech when the generated set of audio characteristics is consistent with audio characteristics of noteworthy audio content.

\* \* \* \* \*